United States Patent
Koenig, II

(10) Patent No.: US 12,103,325 B2
(45) Date of Patent: Oct. 1, 2024

(54) COATING SYSTEM FOR COATING AN OPTICAL SUBSTRATE, METHOD THEREOF AND COATED OPTICAL SUBSTRATE

(71) Applicant: Transitions Optical, Ltd., Tuam (IE)

(72) Inventor: Jerry L. Koenig, II, Largo, FL (US)

(73) Assignee: Transitions Optical, Ltd., Tuam (IE)

(*) Notice: Subject to any disclaimer, the term of this patent is extended or adjusted under 35 U.S.C. 154(b) by 1247 days.

(21) Appl. No.: 16/644,277

(22) PCT Filed: Sep. 7, 2017

(86) PCT No.: PCT/EP2017/072411
§ 371 (c)(1),
(2) Date: Mar. 4, 2020

(87) PCT Pub. No.: WO2019/048041
PCT Pub. Date: Mar. 14, 2019

(65) Prior Publication Data
US 2020/0384788 A1    Dec. 10, 2020

(51) Int. Cl.
*B41M 3/00* (2006.01)
*B41J 2/14* (2006.01)
(Continued)

(52) U.S. Cl.
CPC .......... *B41M 3/003* (2013.01); *B41J 2/14016* (2013.01); *B41J 2/14201* (2013.01);
(Continued)

(58) Field of Classification Search
USPC ......... 118/52, 313, 315, 319, 320, 500, 712, 118/641–643
See application file for complete search history.

(56) References Cited

U.S. PATENT DOCUMENTS 5,374,312 A    12/1994  Hasebe et al.
5,614,024 A  *  3/1997  Ishida ................. H05K 3/1241
                                                                118/712
(Continued)

FOREIGN PATENT DOCUMENTS

CN    1374550 A    10/2002
JP    H0563050 U  *  8/1993
(Continued)

OTHER PUBLICATIONS

English Translation JP2004017004 (Year: 2004).*
English Translation JPH0563050U (Year: 1993).*

*Primary Examiner* — Yewebdar T Tadesse
(74) *Attorney, Agent, or Firm* — The Webb Law Firm

(57) ABSTRACT

A coating system (10) for coating an optical substrate has an identification apparatus (40) configured for identifying an orientation of at least one mark on a surface of the optical substrate; a coating apparatus (30) configured to apply at least one coating material on at least a portion of the optical substrate in a predetermined pattern by a controlled deposition of the at least one coating material in an atomized droplet form; and a robotic placement arm (80) configured to move the optical substrate from the identification apparatus (40) to the coating apparatus (30) and position the optical substrate at a predetermined orientation relative to the coating apparatus (30) based on the orientation of the at least one mark. The coating system (10) may have a second coating apparatus, such as a spin coating apparatus.

12 Claims, 3 Drawing Sheets

(51) Int. Cl.
*B41J 3/407* (2006.01)
*B41J 11/00* (2006.01)
*B41J 29/393* (2006.01)
*B41M 5/00* (2006.01)

(52) U.S. Cl.
CPC ............ *B41J 3/407* (2013.01); *B41J 29/393* (2013.01); *B41M 5/0047* (2013.01); *B41J 2203/01* (2020.08)

(56) References Cited

U.S. PATENT DOCUMENTS

| | | | |
|---|---|---|---|
| 5,658,501 A | 8/1997 | Kumar et al. | |
| 5,962,617 A | 10/1999 | Slagel | |
| 8,293,330 B2 | 10/2012 | Shinde et al. | |
| 9,690,021 B2 | 6/2017 | Turpen et al. | |
| 10,281,628 B2 | 5/2019 | Koenig, II et al. | |
| 2002/0105080 A1* | 8/2002 | Speakman | H10N 10/01 438/609 |
| 2004/0051190 A1 | 3/2004 | Slack et al. | |
| 2005/0076831 A1 | 4/2005 | Gilliard et al. | |
| 2007/0264426 A1 | 11/2007 | Mosse | |
| 2009/0133624 A1 | 5/2009 | Takahashi et al. | |
| 2009/0133625 A1* | 5/2009 | Takahashi | B05B 13/0221 118/712 |
| 2013/0000499 A1 | 1/2013 | Ookubo et al. | |
| 2013/0008374 A1 | 1/2013 | Ookubo et al. | |
| 2016/0243578 A1* | 8/2016 | Mackinnon | B05B 12/04 |
| 2016/0243579 A1* | 8/2016 | Koenig, II | C08G 18/807 |
| 2018/0299702 A1 | 10/2018 | Nguyen et al. | |

FOREIGN PATENT DOCUMENTS

| | | | | |
|---|---|---|---|---|
| JP | H10282459 A | | 10/1998 | |
| JP | 200417004 A | | 1/2004 | |
| JP | 2004021107 A | | 1/2004 | |
| JP | 2004243187 A | | 9/2004 | |
| JP | 2006142356 A | | 6/2006 | |
| JP | 2007167776 A | | 7/2007 | |
| JP | 2008225070 A | | 9/2008 | |
| JP | 2009101354 A | * | 5/2009 | ....... B29D 11/00865 |
| JP | 2009247914 A | | 10/2009 | |
| JP | 2011136302 A | | 7/2011 | |
| JP | 2013195702 A | | 9/2013 | |
| JP | 2016540239 A | | 12/2016 | |
| WO | 2011122682 A1 | | 10/2011 | |
| WO | 2015054041 A2 | | 4/2015 | |
| WO | 2016142496 A1 | | 9/2016 | |
| WO | 2017074429 A1 | | 5/2017 | |

* cited by examiner

COATING SYSTEM FOR COATING AN OPTICAL SUBSTRATE, METHOD THEREOF AND COATED OPTICAL SUBSTRATE

CROSS-REFERENCE TO RELATED APPLICATION

This application is the United States national phase of International Application No. PCT/EP2017/072411 filed Sep. 7, 2017, the disclosure of which is hereby incorporated by reference in its entirety.

BACKGROUND OF THE INVENTION

Field of the Invention

The present invention relates to an apparatus and method for coating an optical article. In particular, the present invention relates to an inkjet coater for applying a coating to the optical article and a method of using the inkjet coater to coat the optical article.

Description of the Related Art

Inkjet coating processes and associated inkjet coating machines, generally called inkjet coaters, are typically used to provide a uniform coating on a substrate. Inkjet coating processes have been used to form coated substrates, such as lenses, including optical lenses. With certain optical lenses, special care must be taken with regard to the orientation of the optical lens relative to the coating machine. For example, when applying gradient coatings to progressive optical lenses having parts with different focal lengths or optical lenses having finished edges, the orientation of the lens relative to a direction in which the gradient coating is applied is important. The gradient coating effect provides a functional advantage in that the optical lens generally has a higher color density at the top of the lens for improved distance viewing with less color density at the bottom of the lens, and an aesthetic effect for fashion and style.

It would be desirable to develop a new coating system having an inkjet coating machine that can orient the optical lens in a predetermined position for applying a coating to the optical lens. It would be further desirable to develop a method of coating the optical lens using such a coating system.

SUMMARY OF THE INVENTION

In accordance with the present invention, there may be provided a coating system for coating an optical substrate. The coating system may have an identification apparatus configured for identifying an orientation of at least one mark on a surface of the optical substrate, a coating apparatus configured to apply at least one coating material on at least a portion of the optical substrate in a predetermined pattern by a controlled deposition of the at least one coating material in atomized droplet form, and a robotic placement arm configured to move the optical substrate from the identification apparatus to the coating apparatus and position the optical substrate at a predetermined orientation relative to the coating apparatus based on the orientation of the at least one mark.

In accordance with the present invention, the identification apparatus may have at least one sensor for determining the orientation of the at least one mark. The at least one sensor may be an optical sensor. The identification apparatus may have a backlit table. The robotic placement arm or the identification station may move the optical substrate to the predetermined orientation. The coating apparatus may be a piezo-electric inkjet coating apparatus or a thermal inkjet printing apparatus. The coating apparatus may have one or more cartridges filled with the at least one coating material. The coating system may have at least one curing station, where each curing station is independently configured to at least partially cure at least one coating material applied to the optical substrate. Each curing station independently may have at least one of (i) a thermal curing station; (ii) a UV curing station; (iii) an IR curing station; and (iv) combinations of at least two of (i), (ii), and (iii).

In accordance with the present invention, the coating system may have a washing and drying station. The washing and drying station may be configured to selectively wash and dry each optical substrate, and may be accessible by the robotic placement arm. The coating system may also have a pre-treatment station configured for raising wettability of the optical substrate to promote adhesion of the at least one coating material with the optical substrate. The pre-treatment station may be accessible by the robotic placement arm. The pre-treatment station may be a plasma discharge device or a corona discharge device. The coating system may have a second coating apparatus, wherein the second coating apparatus is a spin coating apparatus.

In accordance with the present invention, a method for coating an optical substrate may include identifying an orientation of at least one mark on a surface of an optical substrate using an identification apparatus, moving the optical substrate to a coating apparatus and positioning the optical substrate at a predetermined orientation relative to the coating apparatus based on the orientation of the at least one mark, and applying at least one coating material on at least a portion of the optical substrate using the coating apparatus. The at least one coating material may be applied in a predetermined pattern by a controlled deposition of the at least one coating material in an atomized droplet form. A coated optical substrate may have at least one surface at least partially coated with at least one coating material in accordance with this method.

The features that characterize the present invention are pointed out with particularity in the claims, which are annexed to and form a part of this disclosure. These and other features of the invention, its operating advantages, and the specific objects obtained by its use will be more fully understood from the following detailed description in which non-limiting examples of the invention are illustrated and described.

BRIEF DESCRIPTION OF THE DRAWINGS

In FIGS. 1-6, like characters refer to the same components and elements, as the case may be, unless otherwise stated.

DETAILED DESCRIPTION OF THE INVENTION

Figure 1:
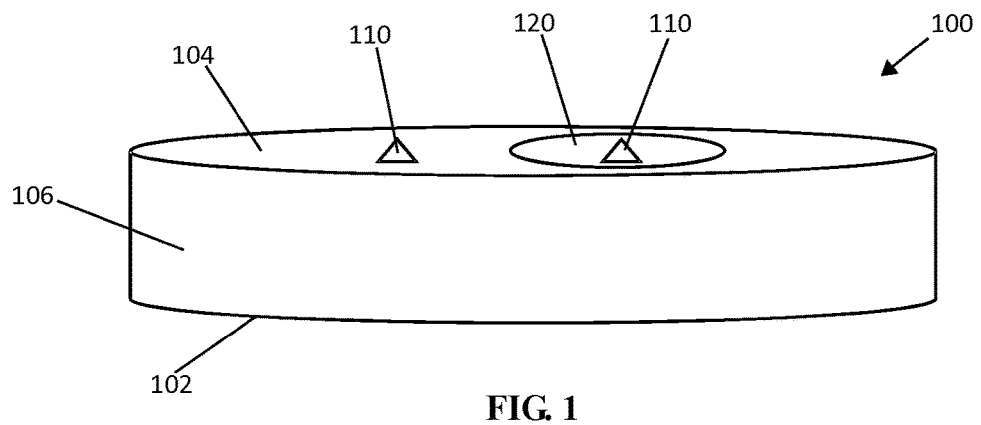
FIG. 1 is a representative bottom perspective view of an optical article according to some examples of the present invention.

As used in the specification and the claims, the singular form of "a", "an", and "the" include plural referents unless the context clearly dictates otherwise.

Spatial or directional terms, such as "left", "right", "inner", "outer", "above", "below", and the like, are not to be considered as limiting as the invention can assume various alternative orientations.

All numbers used in the specification and claims are to be understood as being modified in all instances by the term "about". The term "about" means a range of plus or minus ten percent of the stated value.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

The terms "first", "second", and the like are not intended to refer to any particular order or chronology, but instead refer to different conditions, properties, or elements.

All documents referred to herein are "incorporated by reference" in their entirety.

The term "at least" means "greater than or equal to". The term "not greater than" means "less than or equal to".

The term "includes" is synonymous with "comprises".

The term "optical" means pertaining to or associated with light and/or vision. For example, according to various non-limiting examples disclosed herein, the optical element, article, or device can be chosen from ophthalmic elements, articles, and devices, display elements, articles, and devices, visors, windows, and mirrors.

The term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors.

As used herein, the terms "lens" and "lenses" mean and encompass at least, individual lenses, lens pairs, partially formed (or semi-finished) lenses, fully formed (or finished) lenses, and lens blanks.

As used herein, the term "a mark" means one or more marks.

As used herein, the term "photochromic" and similar terms, such as "photochromic compound" mean having an absorption spectrum for at least visible radiation that varies in response to absorption of at least actinic radiation. Further, as used herein, the term "photochromic material" means any substance that is adapted to display photochromic properties (i.e. adapted to have an absorption spectrum for at least visible radiation that varies in response to absorption of at least actinic radiation) and which includes at least one photochromic compound.

As used herein, the term "transparent", such as used in connection with a substrate, film, material, and/or coating, means that the indicated substrate (such as coating, film and/or material) has the property of transmitting light without appreciable scattering so that objects lying beyond are visibly observable.

As used herein, the term "coating" means a supported film derived from a flowable coating material, which can optionally have a uniform thickness, and specifically excludes polymeric sheets. As used herein, the terms "layer" and "film" each encompass both coatings (such as a coating layer or a coating film) and sheets, and a layer can include a combination of separate layers, including sub-layers and/or over-layers. In accordance with some examples, and as used herein, the term "coating" means, within appropriate context, the process of applying a coating material (or materials) to the substrate to form a coating (or coating layer).

As used herein, the terms "cure", "cured", and related terms, mean that at least a portion of the polymerizable and/or crosslinkable components that form a curable composition are at least partially polymerized and/or cross-linked. In accordance with some examples, the degree of crosslinking can range from 5% to 100% of complete crosslinking. In accordance with some further examples, the degree of crosslinking can range from 30% to 95%, such as 35% to 95%, or 50% to 95%, or 50% to 85% of complete crosslinking. The degree of crosslinking can range between any combination of these recited lower and upper values, inclusive of the recited values.

As used herein, the term "IR" means infrared, such as infrared radiation.

As used herein, the term "UV" means ultraviolet, such as ultraviolet radiation.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of the following examples of the invention, in any combination. Various examples of the invention may be discussed separately. However, it is to be understood that this is simply for ease of illustration and discussion. In the practice of the invention, one or more aspects of the invention described in one example can be combined with one or more aspects of the invention described in one or more of the other examples.

Coating System

Figure 2:
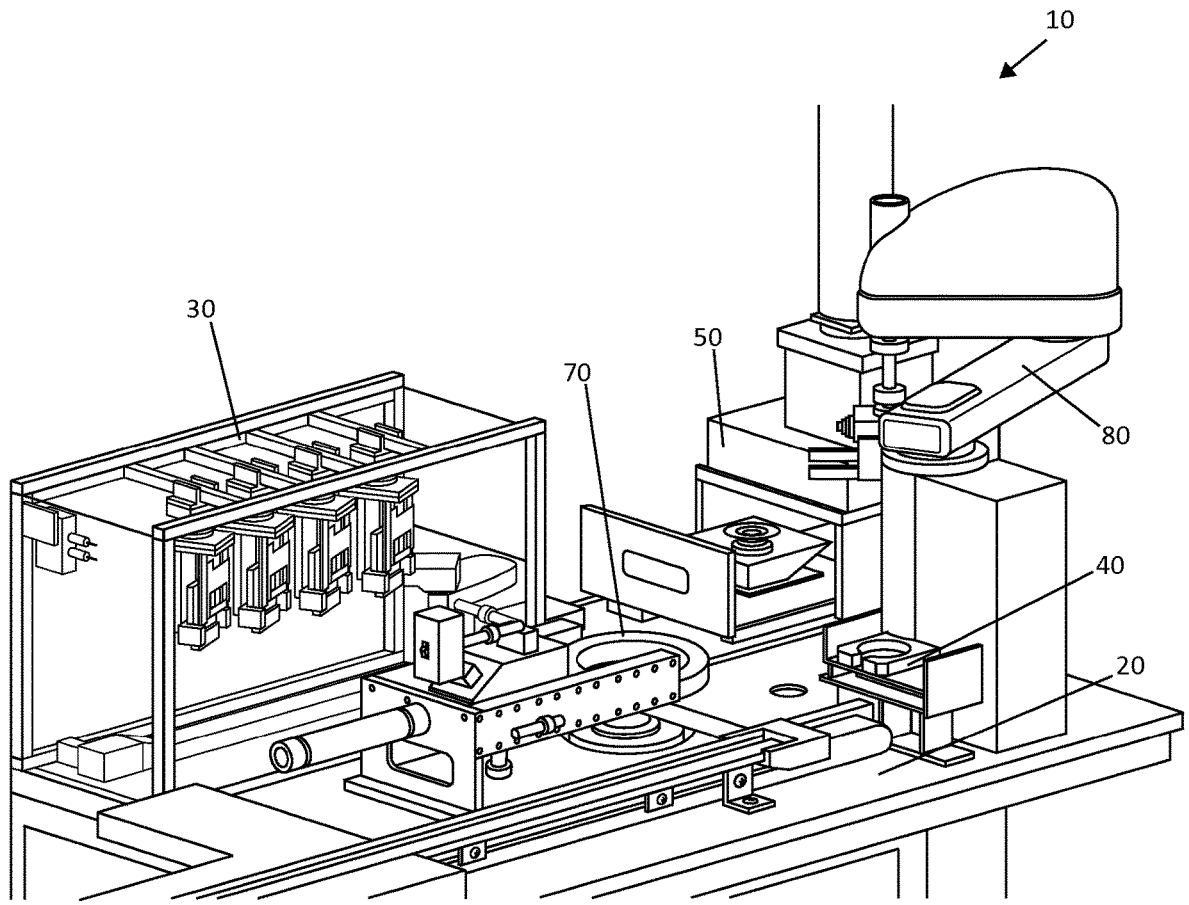
FIG. 2 is a representative perspective view of a coating system according to some examples of the present invention.
Figure 3:
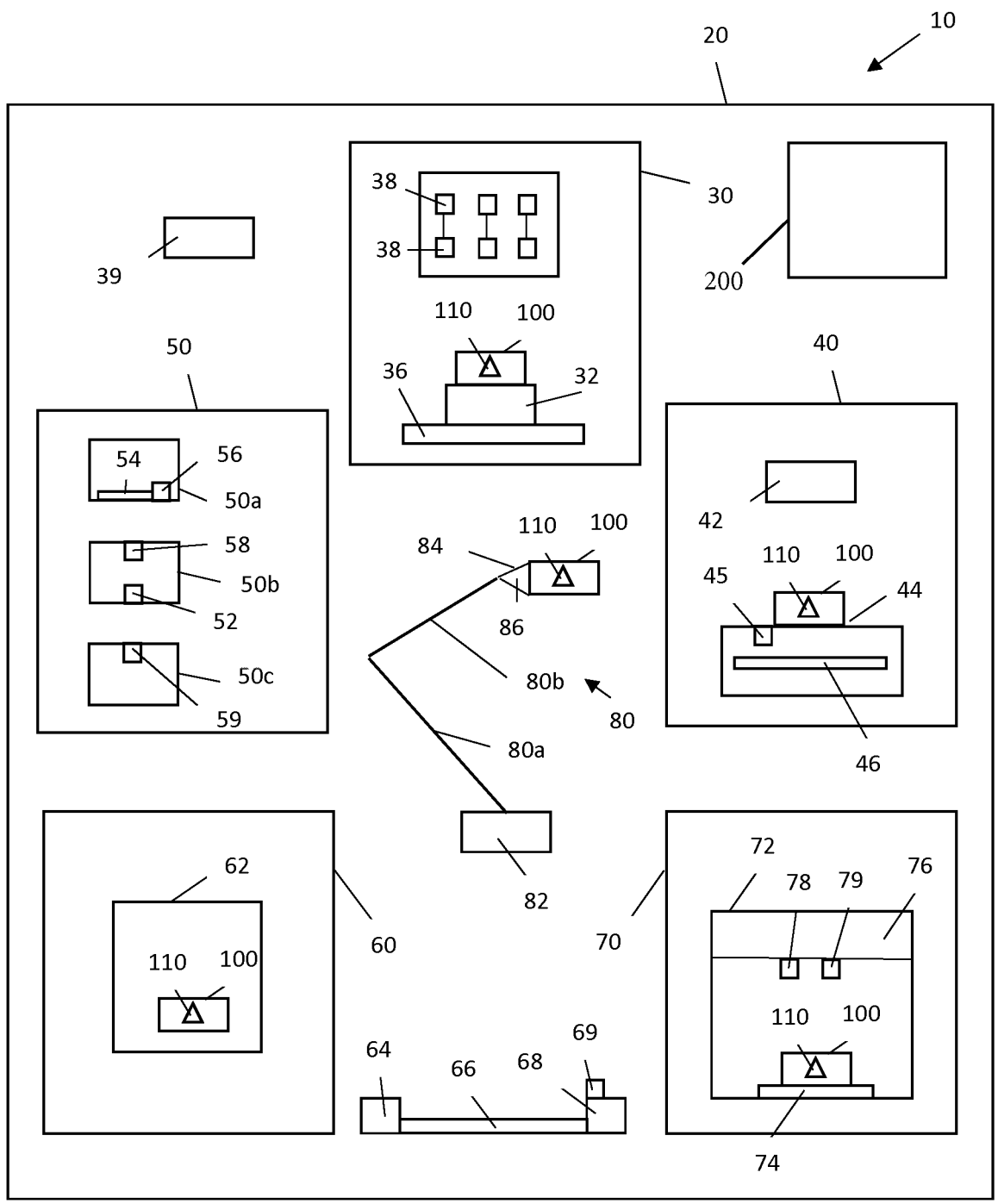
FIG. 3 is a representative schematic plan view of a coating system according to some examples of the present invention.

With reference to FIGS. 2-3, a coating system 10 is shown in accordance with some examples of the present invention. The coating system 10, as described herein, and in accordance with some examples, provides a low cost, small scale (such as, producing up to 100 coated substrates per hour) top side inkjet coating machine that can include a surface pretreatment station (such as, but not limited to, a plasma pretreatment station) that cleans and coats (utilizing one or more of multiple coatings and combinations of coatings), and which utilizes one or more of several different curing methods (such as UV, IR, and/or thermal curing apparatuses) or combinations thereof. The coating system 10 of the present invention can, with some examples, be operated with the formation of minimal waste streams and/or waste materials.

The coating system 10 of the present invention can, with some examples, be used for the production of optical substrates, which each independently have the same or different coating materials applied thereon. In some examples, the coating system 10 of the present invention can be at least partially automated and optionally incorporated into art-recognized product tracking and control systems.

With reference to FIGS. 2-3, the coating system 10 generally has a housing 20 for supporting various stations that define the coating system 10. The housing 20 may be at least partially enclosed or open. In accordance with some examples, the coating system 10 has a coating apparatus 30 for coating the substrate and an identification station 40 for determining an orientation of the substrate. A curing station 50 is provided for curing the coated substrate. Optionally, the coating system 10 has a pre-treatment station 60, and/or a washing and drying station 70. A placement arm, such as a robotic placement arm 80, is provided for moving the optical substrate between various stations of the coating system 10.

Optical Substrate

The coating system 10 can, with some examples, be used to coat a variety of substrates, such as, but not limited to, optical substrates. Examples of optical substrates that can be coated with the coating system 10 of the present invention include, but are not limited to, optical lenses, prescription lenses, which in each case can be finished lenses, unfinished lenses, or lens blanks. In accordance with some further examples, the optical lenses coated with the coating system 10 of the present invention have a diameter of 50-85 mm with varied back curvatures (such as from ½ base up to 10 base). For reference, a finished lens is one that will have the front and rear surface of the lens formed (commonly by grinding and polishing) to the desired contour, while a semi-finished lens will have only one (e.g., the top) surface finished. Both finished and unfinished lenses often undergo further processing such as coating with photochromic material, hard coats, tinting layers, planarizing layers, (generally categorized as coating layers providing optical, aesthetic or protective properties) as well as edging to fit the desired shape, or other processing to couple to a frame or support structure.

With reference to FIG. 1, the optical substrate 100, has a forward or top surface 102, a rearward or bottom surface 104, and a side surface 106 extending between the top surface 102 and the bottom surface 104. When the optical substrate 100 is an ophthalmic lens, the bottom surface 104 is opposed to the eye of an individual wearing the optical substrate 100, the side surface 106 typically resides within a supportive frame, and the top surface 102 faces incident, (not shown) at least a portion of which passes through the optical substrate 100 and into the individual's eye. With some aspects, at least one of the top surface 102, the bottom surface 104, and the side surface 106 may be convex, concave, or planar.

The optical substrate 100 that is coated with the method of the present invention can, with some examples, be formed from and correspondingly include organic materials, inorganic materials, or combinations thereof (for example, composite materials).

Examples of organic materials that can be used as optical substrates 100 in accordance with various examples of the present invention, include polymeric materials, such as homopolymers and copolymers, prepared from the monomers and mixtures of monomers disclosed in U.S. Pat. No. 5,962,617 and in U.S. Pat. No. 5,658,501 from column 15, line 28 to column 16, line 17. For example, such polymeric materials can be thermoplastic or thermoset polymeric materials, can be transparent or optically clear, and can have any refractive index required. Examples of such monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN;

polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, and polyisothiocyanates; and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

With some examples of the present invention, the optical substrate 100 can be an ophthalmic substrate. Examples of organic materials suitable for use in forming ophthalmic substrates include art-recognized polymers that are useful as ophthalmic substrates, such as organic optical resins that are used to prepare optically clear castings for optical applications, such as ophthalmic lenses.

Examples of inorganic materials that can be used as optical substrates 100 with some examples of the present invention include glasses, minerals, ceramics, and metals. With some examples, the optical substrate 100 can include glass. In other examples, the optical substrate 100 can have a reflective surface, for example, a polished ceramic substrate, metal substrate, or mineral substrate. In other examples, a reflective coating or layer (e.g., a metal layer, such as a silver layer) can be deposited or otherwise applied to a surface of an inorganic or an organic substrate to make it reflective or to enhance its reflectivity.

Optical substrates 100 that can be used with the method according to some examples of the present invention can also include untinted, tinted, linearly polarizing, circularly polarizing, elliptically polarizing, photochromic, or tinted-photochromic substrates. As used herein with reference to optical substrates 100, the term "untinted" means optical substrates that are essentially free of coloring agent additions (such as conventional dyes) and have an absorption spectrum for visible radiation that does not vary significantly in response to actinic radiation. Further, with reference to optical substrates 100, the term "tinted" means substrates that have a coloring agent addition (such as conventional dyes) and an absorption spectrum for visible radiation that does not vary significantly in response to actinic radiation.

Mark

With continued reference to FIG. 1, at least one indicia, such as at least one mark 110, may be provided on the optical substrate 100. In some examples, the at least one mark 110 may be shaped to define an optical reference mark that a practitioner may use as a reference point in matching a power of the optical substrate 100 to a wearer's prescription. In other examples, the at least one mark 110 may be an indicia, such as a logo. In some examples, the at least one mark 110 may be used by the coating system 10 to determine an orientation of the optical substrate 100 relative to at least one component of the coating system 10. In some examples, the at least one mark 110 may be a pair of marks 110 used to identify a location/orientation of at least one characteristic of the optical substrate 100, such as the progressiveness of the optical substrate 100 (i.e., location of a smooth transition between parts of the optical substrate 100 with different focal lengths). When a gradient coating is applied to a progressive optical substrate 100, special care must be taken to orient the gradient coating relative to the location of different focal lengths of the optical substrate 100. The optical substrate 100 may be positioned in a desired orientation relative to the at least one component of the coating system 10 based on the orientation of the at least one mark 110.

The at least one mark 110 may be provided on a surface of the optical substrate 100, such as the top surface 102, the bottom surface 104, and/or the side surface 106. In some examples, the at least one mark 110 is formed as a topographical feature that may protrude from the exterior surface of the optical substrate 100, or a topographical feature that is recessed into the exterior surface of the optical substrate 100. In some examples, the at least one mark 110 may be monolithically formed on the optical substrate 100, such as, for example, by molding. In other examples, the at least one mark 110 may be formed on the optical substrate 100 by etching, engraving, or according to other methods known by those skilled in the field to imprint the desired at least one mark 110 on the optical substrate 100.

In some examples, the at least one mark 110 may be applied to at least one surface of the optical substrate 100. For example, the at least one mark 110 may be adhesively applied, printed, written, or otherwise applied to the at least one surface of the optical substrate 100.

In some examples, the at least one mark 110 may be provided on a carrier 120 that is separate from the optical substrate 100. The carrier may be removably or non-removably applied to at least one surface of the optical substrate 100. For example, the carrier 120 may be an adhesive tape that is removably applied to one or more of the top surface 102, the bottom surface 104, and/or the side surface 106 of the optical substrate 100. The carrier 120 may be applied to the at least one surface of the optical substrate 100 during the coating process. After the optical substrate 100 is coated, the carrier 120 may be removed. The carrier 120 may be transparent or translucent such that the at least one mark 110 may be easily identified.

The at least one mark 110 may be formed as an array of a plurality of individual marks 110 that, taken together, define the boundaries of the mark 110. Where a plurality of marks 110 are provided on the exterior surface of the optical substrate 100, the plurality of marks 110 may be provided in a same plane or different planes. The at least one mark 110 may be in the form of patterns and designs. Examples of patterns and designs include, but are not limited to, letters and numbers from one or more languages. In some examples, the at least one mark 110 is in the form of a one-dimensional barcode and/or a two dimensional barcode.

Robotic Placement Arm

With reference to FIG. 3, movement of the optical substrate 100 between various stations of the coating system 10 may be automated with a robotic placement arm 80. In some examples, a plurality of robotic placement arms 80 may be provided. The robotic placement arm 80 is configured to engage the optical substrate 100 in a manner that maintains a known center position of the optical substrate 100, such as within about 2 mm, and move the optical substrate 100 between different stations of the coating system 10. The known center position of the optical substrate 100 can be so maintained as a result of a combination of the accuracy of robotic placement arm 80 and the proper initial positioning of the optical substrate 100, such as the positioning of the optical substrate 100 based on the orientation of the at least one mark 110 on the optical substrate 100.

The robotic placement arm 80 may have one or more sections 80a, 80b that are independently movable relative to a base 82 of the robotic placement arm 80. The one or more sections 80a, 80b may be rotatable or translatable relative to the base 82. The one or more sections 80a, 80b of the robotic placement arm 80 define an envelope in which the robotic placement arm 80 operates to place the optical substrate 100 at any location within the envelope. Desirably, the robotic placement arm 80 is configured such that all of the stations of the coating system 10 are within the envelope of the robotic placement arm 80. The use of the robotic placement arm 80 allows the coating system 10 to be fully automated within the envelope of the robotic placement arm 80 and minimizes damage to, such as marking of the surfaces of the optical substrate 100, compared to a manual process, such as a fully manual process.

The optical substrate 100 can be wet or dry when picked up by the robotic placement arm 80. With some examples, when wet, the optical substrate 100 includes one or more wet coating layers thereon that are not hard, such as being tacky and/or uncured. With some further examples, when dry, the optical substrate 100 is free of coating layers or includes one or more dry coating layers that are hard (and not tacky), such as being cured. In various examples, the robotic placement arm 80 is configured for picking up the optical substrate 100 by contacting at least one surface of the optical substrate.

In accordance with some examples, a lower and/or side portion of the gripper elements 84 of the robotic placement arm 80 engage and secure the bottom surface 104 and/or the side surface 106 of the optical substrate 100 during wet pick up thereof (when the optical substrate 100 is wet). With some further examples, an upper and/or side portion of the gripper elements 84 of the robotic placement arm 80 engage and secure the top surface 102 and/or the side surface 106 of the optical substrate 100 during dry pick up thereof (when the optical substrate 100 is dry). With further examples, the lower and/or side portion of the gripper elements 84 of the robotic placement arm 80 engage and secure the bottom surface 104 and/or the side surface 106 of the optical substrate 100 during wet or dry pick up thereof. The bottom surface 104 of the optical substrate 100 may have an adhesive element 112 that is configured for securing the optical substrate 100 to the gripping elements 84 of the robotic placement arm 80. The adhesive element 112 may be removably adhered to the bottom surface 104 of the optical substrate 100. For example, the adhesive element 112 may be adhesively connected to the optical substrate 100 during processing of the optical substrate 100 in the coating system 10. After the final processing step, the adhesive element 112 may be removed from the bottom surface 104 of the optical substrate 100.

In accordance with some examples, the robotic placement arm 80 may be configured for engaging and securing a carrier 86 configured for removably securing the optical substrate 100 thereto. For example, the gripper elements 84 of the robotic placement arm 80 engage and secure the carrier 86 for transporting the carrier 86 between various stations of the coating system 10. The carrier 86 may have at least one carrying surface 88 for engaging at least one surface of the optical substrate 100.

Identification Station

With continued reference to FIG. 3, the coating system 10 has an inspection apparatus or station 40 configured for identifying the at least one mark 110 on the optical substrate 100. As discussed herein, the at least one mark 110 may be formed directly on the surface of the optical substrate 100, or it may be formed on a carrier 120 that is removably or non-removably connected to at least one surface of the optical substrate 100. The inspection station 40 may be used to identify an orientation of the at least one mark 110 on the optical substrate 100. Based on the orientation of the at least one mark 110 on the optical substrate 100, the optical substrate 100 can be positioned in one or more stations 40 at a predetermined orientation relative to the one or more stations 40 of the coating system 10.

In some examples, the identification station 40 has at least one sensor 42 for identifying the at least one mark 110 on the optical substrate 100. For example, the at least one sensor 42 may be an optical sensor, such as a camera. The optical sensor 42 may be configured to image the optical substrate 100. An identification algorithm may be used to identify the at least one mark 110 from the image of the optical substrate 100 taken by the at least one sensor 42. The identification algorithm may be used, for example, to identify an orientation of the at least one mark 110 relative to an orientation of a known mark 45 on the inspection station 40. The at least one sensor 42 may be movable relative to the optical substrate 100. For example, the at least one sensor 42 may be moved relative to the optical substrate 100, such as by translation in a direction along one or more of axes of the Cartesian coordinate system (X, Y, Z axes) or by rotation about the one or more axes of Cartesian coordinate system, to position the optical substrate 100 within the field of view of the at least one sensor 42 where the at least one mark 110 can be clearly detected by the at least one sensor 42.

In some examples, the identification station 40 may have a support surface 44 for supporting the optical substrate 100 during identification of the at least one mark 110. The support surface 44 may be a transparent or translucent support surface that is backlit by a light source 46. Backlighting the background of the support surface 44 helps increase the contrast between the optical substrate 100 and the surrounding environment to more easily identify the mark 110. The support surface 44 may be movable relative to the at least one sensor 42. For example, the support surface 44 having the optical substrate 100 positioned thereon may be moved relative to the at least one sensor 42, such as by translation in a direction along one or more of axes of the Cartesian coordinate system or by rotation about the one or more axes of Cartesian coordinate system, to position the optical substrate 100 within the field of view of the at least one sensor 42 where the at least one mark 110 can be clearly detected by the at least one sensor 42. In some examples, both the support surface 44 and the at least one sensor 42 may be movable to position the optical substrate 100 within the field of view of the at least one sensor 42 where the at least one mark 110 can be clearly detected by the at least one sensor 42.

Based on determining the orientation of the at least one mark 110 on the surface of the optical article 100, the robotic positioning arm 80 can be used to move the optical article 100 to one or more stations 40 at a predetermined orientation relative to the one or more stations of the coating system 10. The robotic placement arm 80 is configured to engage the optical substrate 100 in a manner that maintains a known orientation of the optical substrate 100 and move the optical substrate 100 between the identification station 40 and at least another station of the coating system 10 based on this known orientation. The known orientation of the optical substrate 100 can be so maintained as a result of a combination of the accuracy of robotic placement arm 80 and the proper initial positioning of the optical substrate 100, such as positioning of the optical substrate 100 based on the orientation of the at least one mark 110 on the optical substrate 100. In some examples, the robotic placement arm 80 may rotate the gripping elements 84 to orient itself to pick up the optical substrate 100 at a predetermined position of the optical substrate 100 relative to the robotic placement arm 80 based on the position of the at least one mark 110. In other examples, at least a portion of the identification station 40, such as a rotating platform 48, may rotate to orient the optical substrate 100 relative to the robotic placement arm 80 at a predetermined position based on the orientation of the at least one mark 110. In other examples, both the robotic placement arm 80 and the rotating platform 48 may rotate to orient the optical substrate 100 relative to the robotic placement arm 80 at a predetermined position based on the orientation of the at least one mark 110.

Pre-Treatment Station

With continued reference to FIG. 3, the coating system 10 has a pre-treatment station 60, such as a plasma chamber 62. Following inspection of the optical substrate 100 in the identification station 40, the robotic placement arm 80 engages the optical substrate 100 and moves it to the pre-treatment station 60. The robotic placement arm 80 may optionally position the optical substrate 100 in the pre-treatment station 60 at a predetermined orientation relative to the pre-treatment station 60 based on the orientation of the at least one mark 110 on the optical substrate 100.

The plasma surface treatment conducted within the chamber 62 can be selected from one or more art-recognized plasma surface treatment methods including, but not limited to, corona treatment, atmospheric plasma treatment, atmospheric-pressure treatment, flame plasma treatment, and/or chemical plasma treatment. With some examples, the surface treatment conducted in the chamber 62 is an oxygen plasma treatment. The surface treatment process involves, with some examples, treating the surface of the optical substrate 100 to promote wetting and enhance adhesion of a coating that is subsequently applied to and formed thereon. The chamber 62, with some examples, includes a series of edge engaging optical substrate holders to allow the maximum surface treatment of the optical substrates 100 in the chamber 62. The chamber 62, with some examples, is operated under conditions of reduced atmosphere, and correspondingly the surface treatment may be conducted as a batch process.

Plasma treatments, including corona treatments, provide a clean and efficient method of altering the surface properties of an optical substrate 100, such as roughening and/or chemically altering one or more surfaces thereof, without altering the bulk properties of the optical substrate 100. With some examples, one or more inert gases (such as but not limited to argon and/or nitrogen) and/or one or more reactive gases (such as but not limited to oxygen, CO, and/or $CO_2$) can be used as the gas in the chamber 62 from which the plasma is formed. Inert gases, with some examples, roughen the surface of optical substrate 100. Reactive gases such as oxygen, with some examples, can both roughen and chemically alter the surface exposed to the plasma by, for example, forming hydroxyl and/or carboxyl groups on the treated surface.

With some examples, the use of oxygen in the plasma surface treatment process can provide an effective degree of physical roughening and chemical modification of the surface of the optical substrate 100, which can improve adhesion without detrimentally effecting other properties, such as optical properties, of the optical substrate 100. Atmospheric air can also be used to form the plasma gas, and with some examples is a reactive gas. The extent of the surface roughening and/or chemical modification is, with some examples, a function of the plasma gas and the operating conditions of the chamber 62, including the length of time of the surface treatment. With some examples, the optical substrates 100 are exposed to a plasma surface treatment for 1 to 5 minutes, such as in the chamber 62, which results in the formation of surface treated optical substrates 100 that are further processed in the coating apparatus 30. Surface treatment of the optical substrates 100 within the chamber 62 can also remove foreign contaminants present on the surface thereof. The presence of certain surface contaminants can, with some examples, undesirably reduce the surface energy of the surface of the optical substrate 100. A high surface energy, which can result after removal of the surface contaminants, promotes coating wetting, with some examples.

Following the plasma surface treatment in the chamber 62, the surface treated optical substrates 100 are removed and can optionally be subjected to visual and/or automated inspection prior to placement onto a loading unit 64. The optical substrates 100 are forwarded along a path of travel 66 on the loading unit 64, which can be achieved by way of a conveyer, such as a conveyer belt. The optical substrates 100 are forwarded along the path of travel 66 until they engage a positioning pocket 68. The loading unit 64 queues the optical substrates 100, and prevents the optical substrates 100 from damaging each other (such as by engaging/rubbing/knocking each other) while sequentially presenting and introducing each individual optical substrate 100 into positioning pocket 68. The edges of the positioning pocket 68 are configured, such as angled, to position each individual optical substrate 100 in a pre-selected position (such as a centered position or location) relative to the width of the positioning pocket 68. The positioning pocket 68 also includes, with some examples, at least one (such as at least two) proximity sensor (such as beam breaking sensors 69) that identifies the leading edge and/or trailing edge of each individual optical substrate 100, and causes the path of travel 66 to stop when the optical substrate 100 is sensed and determined to be properly positioned (such as centered) within the positioning pocket 68.

Washing and Drying Station

With continued reference to FIG. 3, the coating system 10 optionally has a washing and drying station 70. Following surface treatment of the optical substrate 100 in the pretreatment station 60, the robotic placement arm 80 engages the optical substrate 100 and moves it to the washing and drying station 70. The robotic placement arm 80 may optionally position the optical substrate 100 in the washing and drying station 70 at a predetermined orientation relative to the washing and drying station 70 based on the orientation of the at least one mark 110 on the optical substrate 100.

With some examples, the washing and drying station 70 has a rotatable chuck 72, which can be a rotatable vacuum chuck with some examples, within a housing 74 of the washing and drying station 70. The rotatable chuck 72 can rotate at high speeds, such as up to 4,000 rpm, with some examples. After securing the optical substrate 100 onto the rotatable chuck 72, a cover 76 is moved to a closed position and high pressure water spray nozzles 78 are activated with the optical substrate 100 held on the rotating chuck 72. In some examples, the high pressure water spray nozzles 78 may be angled relative to the surface of the optical substrate 100. In this manner the entire upper surface and edge of the optical substrate 100 can be cleaned, such as with deionized water under conditions of elevated pressure, such as about 1,000 psi, with some examples. The rotatable chuck 72 can rotate during spray washing to assure even cleaning of the optical substrate 100. The washing parameters, such as liquid pressure, washing time, and rotating speed can be programmable and can vary based on parameters, such as the type and/or size of the optical substrate 100, plasma treatment, and/or subsequent coating processes.

Following washing, the optical substrate 100 can, with some examples, be dried in the washing and drying station 70 by one or more drying methods including, but not limited to, high speed rotation of the rotatable chuck 72 and/or high speed air nozzle(s) 79, which can be filtered air nozzles 79. The drying parameters can be programmed in a manner similar to those associated with the washing parameters, with some examples.

Coating Apparatus

With continued reference to FIG. 3, the coating apparatus 30, such as an inkjet printing apparatus, is configured to apply a coating material in the form of extremely fine droplets on a printing surface, such as one or more surfaces of the optical substrate 100. Following washing and drying of the optical substrate 100, the robotic placement arm 80 reengages the optical substrate 100 and moves it to the coating apparatus 30. The robotic placement arm 80 may position the optical substrate 100 in the coating apparatus 30 at a predetermined orientation relative to the coating apparatus 30 based on the orientation of the at least one mark 110 on the optical substrate 100. In this manner, the optical substrate 100 can be aligned at a desired orientation relative to the coating apparatus 30. The robotic placement arm 80 may move the optical substrate 100 to the identification station 40 prior to positioning the optical substrate 100 in the coating apparatus 30 in order to determine the orientation of the at least one mark 110 on the surface of the optical substrate 100 such that the optical substrate 100 can be positioned at a predetermined orientation relative to the coating apparatus 30 based on the orientation of the at least one mark 110. For example, the optical substrate 100 may be arranged such that the at least one mark 110 is substantially parallel, perpendicular, or arranged in any other orientation relative to a direction in which a coating material is applied to the optical substrate 100 using the coating apparatus 30.

A discharge apparatus associated with the coating apparatus 30, such as one or more print heads, has one or more nozzles 78 associated therewith. Each of the nozzles 78 is configured to controllably discharge a single droplet of the coating material, either continuously or on-demand. In the on-demand system, the discharge of droplets is controlled by a controller 39 having a pre-determined droplet discharge profile. For example, the controller may control the size of the drop (volume of coating material) and the speed at which the drop is formed and delivered. In some aspects, the one or more print heads may be provided with one or more piezoelectric elements that provide a mechanism for forming and discharging the droplets from the one or more print heads. A voltage applied to the one or more piezoelectric elements, such as a control voltage determined by the controller 39, changes the shape of the one or more piezoelectric elements, thereby generating a pressure pulse in the coating material, which forces a droplet of the coating material from the nozzle 78. In other aspects, the one or more print heads may have at least one chamber 62 including a heater. A droplet is ejected from the chamber when a pulse of voltage is passed across the heater, such as a control voltage determined by the controller 39. Such a voltage differential causes a rapid vaporization of the coating material in the chamber 62 and forms a bubble. Formation of the bubble causes a pressure differential within the chamber 62, thereby propelling a droplet of the coating material onto the coating surface. The controller 39 directs one or more print heads to generate droplets on demand. In this manner, the timing, position, and volume of coating material delivered per unit of area of the printing surface can be controlled.

Each droplet discharged from the nozzle 78 of the print head is deposited on the surface of the optical substrate 100 in the form of a single dot. Thus, an assembly of deposited droplets creates an array that enables a pattern to be formed. In this manner, all or portions of a printing surface may be coated. When one or more portions of the printing surface are printed, various designs, such as characters, numbers, images, or the like, may be formed on the printing surface. When the entire printing surface is printed, the assembly of deposited droplets forms a layer of the coating material on the printing surface, such as the optical substrate 100.

With continued reference to FIG. 3, the coating apparatus 30 has substrate holder 32 and one or more print heads 34. In some examples, the substrate holder 32 may be configured to securely retain the optical substrate 100 during the printing operation. In some examples, the substrate holder 32 may be configured to retain a frame, such as an eyeglass frame, having the optical substrate 100 mounted therein.

The substrate holder 32 may be attached to a movable base 36 that moves the substrate holder 32, along with the optical substrate 100 secured thereto, relative to the one or more print heads 34. The movable base 36 may be movable in a linear direction in one, two, or three axes. Additionally, or in the alternative, the movable base 36 may be rotatable about one, two, or three axes. In this manner, the movable base 36 may have up to six degrees of freedom to move the substrate holder 32 relative to the one or more print heads 34 in order to position the optical substrate 100 in a predetermined position relative to the one or more print heads 34. The movable base 36 may be moved manually, or its movement may be controlled by one or more motors.

In other examples, the substrate holder 32 may be stationary, while the one or more print heads 34 are provided with a movable base 36 to move the one or more print heads 34 relative to the substrate holder 32. Each print head 34 may be movable independently of any other print head 34. Similar to the substrate holder 32, the one or more print heads 34 may be movable in up to six directions (translation in three axes and rotation about three axes). In further examples, both the substrate holder 32 and the one or more print heads 34 may be movable on a movable base 36. In further examples, both the substrate holder 32 and the one or more print heads 34 may be stationary.

An uncoated optical substrate 100 may be loaded into the substrate holder 32 using the robotic placement arm 80 prior to coating the surface of the optical substrate 100 using the one or more print heads 34. The coated optical substrate 100 may then be removed from the substrate holder 32 using the robotic placement arm 80 to allow a subsequent, uncoated optical substrate 100 to be loaded. In some examples, a plurality of substrate holders 32 (not shown) may be provided on a continuously moving movable base 36 such that a plurality of optical substrates 100 may be coated in a continuous process.

Each print head 34 is in fluid communication with a storage reservoir 38. When the coating apparatus 30 has more than one print head 34, individual storage reservoirs 38 may be provided for each print head 34. Each storage reservoir 38 is configured to store a coating material to be delivered to the one or more print heads 34. In this manner, it is possible to print a plurality of different coating materials at the same time by using a plurality of print heads 34 to generate various coatings or mixtures of different coating materials. Various additional devices, such as heaters, mixers, or the like, may be associated with each storage reservoir 38 for preparing the coating material prior to delivery to the one or more print heads 34. In some examples, viscosity of the coating material may be controlled, such as by increasing or reducing the viscosity of the coating material, prior to loading the coating material into the storage reservoir 38. In some examples, heating of the coating material within print head manifold or reservoir 38 also may be used to control coating viscosity prior to delivering the coating material to the one or more print heads 34.

With continued reference to FIG. 3, a plurality of print heads 34 may be arranged in an array. The plurality of print heads 34 may be arranged parallel to one another in a direction that is angled relative to a direction in which the optical substrate 100 is moved relative to the print heads 34. Offsetting the print heads 34 at an angle relative to the direction in which the optical substrate 100 is moved relative to the print heads 34 allows a complete coverage of optical substrates 100 of various shapes and sizes. In some examples, the print heads 34 may be arranged linearly next to one another in a direction substantially parallel or perpendicular to the direction in which the optical substrate 100 is moved relative to the print heads 34.

During the coating process, the coating material may be applied on the optical substrate 100 in a single pass in which the optical substrate 100 is held stationary and the one or more print heads 34 are moved, or in which the optical substrate 100 is moved and the one or more print heads 34 are held stationary, or in which both the optical substrate 100 and the one or more print heads 34 are moved or held stationary. The single pass may be performed using a single print head 34 or multiple print heads 34. In some examples, the coating material may be applied on the optical substrate 100 in two or more passes in which the optical substrate 100 is held stationary and the one or more print heads 34 are moved, or in which the optical substrate 100 is moved and the one or more print heads 34 are held stationary, or in which both the optical substrate 100 and the one or more print heads 34 are moved or held stationary. Two or more passes may be performed using a single print head 34 or multiple print heads 34.

In various examples, the one or more print heads 34 may be controlled to apply a predetermined pattern by a controlled deposition of the at least one coating material in an atomized droplet form. For example, the one or more print heads 34 may be controlled to form at least one light influencing zone on the optical substrate 100, thereby defining a gradient pattern. As used herein, the term "light influencing zone" refers to a portion of an optical substrate 100 having a capability to exhibit one or more optical properties when light contacts or traverses through the optical substrate 100. Non-limiting examples of light influencing properties include photochromic and/or photochromic-dichroic reversible changes, color/tint, polarization, or combinations thereof. The one or more print heads 34 can apply a coating composition over the optical substrate 100 to form at least one light influencing zone with a gradient color/tint. As used herein, "gradient color/tint" refers to an increase or decrease in the magnitude or degree of color/tint throughout the at least one light influencing zone. The optical substrate 100 can be formed with any combination of the previously described non-limiting light influencing zones and properties. Further, the optical substrate 100 can comprise any desired number of light influencing zones including, but not limited to, two or more, three or more, or four or more light influencing zones. The number and types of light influencing zones can be selected based on the desired use of the optical substrate 100.

In various examples, the one or more print heads 34 may be controlled to apply uniform or non-uniform thickness of a coated layer. For example, the one or more print heads 34 may apply a coating having a substantially uniform thickness over an entire coated surface of the optical substrate 100. In some examples, application quantity of the coating material may be controlled in various regions of the optical substrate 100 to account for movement of the coating material on a curved surface of the optical substrate 100. For example, on a convex optical substrate 100, the application quantity of the coating material on a radially inner portion of the optical substrate 100 may be higher than an application quantity of the coating material on a radially outer portion of the optical substrate 100 in order to form a coating layer having a uniform thickness. In other examples, the coating layer may have a non-uniform thickness on various portions of the optical substrate 100.

With continued reference to FIG. 3, the coating apparatus 30 may have a controller 39 for controlling the operation of the coating apparatus 30. The controller 39 may be configured for controlling the printing operations of the one or more print heads 34 and/or movement operations of the optical substrate 10 and/or the one or more print heads 34. In addition, the controller 39 may be configured to control the filling and delivery operations of the coating material in the one or more storage reservoirs 38.

Second Coating Apparatus

In some examples, the coating apparatus 30 may be a plurality of coating apparatuses 30. The plurality of coating apparatuses 30 may be the same type of coating apparatuses (i.e., inkjet), or different type of coating apparatuses, such as, without limitation, inkjet coating apparatuses, spin coating apparatuses, and dip coating apparatuses. With reference to FIG. 3, a second coating apparatus 200, such as a spin coating apparatus described in U.S. Patent Application Publication No. 2016/0243579, may be configured for applying a coating material onto a previously coated or uncoated optical substrate 100. Following the processing of the optical substrate 100 in one or more stations of the coating system 10, such as the washing and drying station 70 or the coating apparatus 30, the robotic placement arm 80 reengages the optical substrate 100 and moves it to the second coating apparatus 200. While the robotic placement arm 80 may position the optical substrate 100 in the second coating apparatus 200 at a predetermined orientation relative to the second coating apparatus 200 based on the orientation of the at least one mark 110 on the optical substrate 100, such operation may not be necessary when the second coating apparatus 200 is a spin coating apparatus.

Figure 4:
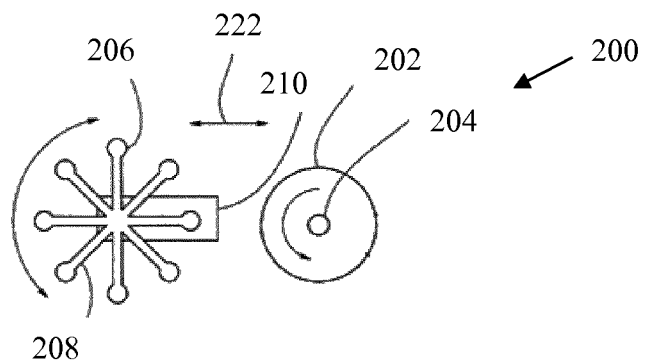
FIG. 4 is a representative schematic plan view of a modified example of a second coating apparatus of FIG. 3.

With reference to FIG. 4, the second coating apparatus 200 may be a spin coating apparatus having a coater bowl 202, which can be a rotatable vacuum chuck 204 with some embodiments. The rotatable chuck 204 is configured to receive the optical substrate 100 within coater bowl 202 and is configured to rotate the optical substrate 100 during coating, the speed and timing of which can vary depending upon parameters including, but not limited to, the coating and optical substrate 100.

The coater bowl 202 is configured to collect: excess coating material expelled from the optical substrate 100 that is coated therein; and/or expelled during purging of the reservoirs 206 discussed further herein; and/or cleaning materials that are periodically utilized to clean coater bowl 202 (such as at the end of the week, or day, or shift). The second coating apparatus 200 of the present invention is effective as a once through system for small scale production, with some embodiments. A once through system means that the collected materials need not be recirculated and thus the collected material from coater bowl 202, can be removed through a drain not shown, need not be segregated or processed for reuse. A once through system allows for the efficient change out of distinct coating materials, with some embodiments.

Figure 5:
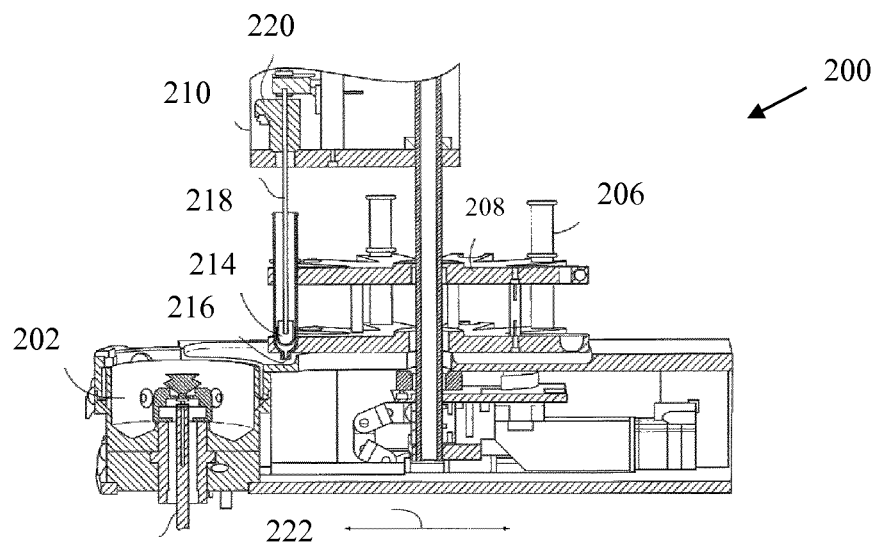
FIG. 5 is a representative section view of an indexable coating reservoir platform containing a plurality of coating reservoirs and a dispensing unit of the second coating apparatus of FIG. 4.

The second coating apparatus 200 of the present invention includes, with some embodiments, an indexable coating reservoir platform 208 containing a plurality of coating reservoirs 206. Indexable coating reservoir platform 208 is configured to index a selected coating reservoir 206 into a dispensing position above coater bowl 202, so the coating reservoir 206 can be dispensed with a dispensing unit 210 at the dispensing position as shown in FIG. 5. The dispensing unit 210 is engagable with the selected coating reservoir 206 in the dispensing position to dispense a select (or predetermined) amount of coating material from the engaged and selected coating reservoir 206.

The indexable coating reservoir platform 208 is a rotatable carousel having distinct circumferential positions, in which each distinct circumferential position reversibly receives one of the plurality of disposable coating reservoirs 206. The carousel can, with some embodiments include eight- or ten-stations. The carousel can have other numbers of positions for reservoirs 206, with some further embodiments, such as, but not limited to, eighteen- or twenty-stations. The rotating carousel as shown represents an efficient embodiment for forming and operating the indexable coating reservoir platform 208. Other indexing arrangements, however, can be used in accordance with the spin coater of the present invention. For purposes of non-limiting illustration, a linearly moving rack or line of reservoirs 206 can be used for forming platform 208, with no limit on the number of distinct reservoirs 206 that can be present in such an arrangement. The motor rotating the platform 208 can utilize a variety of art-recognized alignment mechanisms, such as a spring biased detent locking mechanism, to assure the held reservoirs 206 are moved into precise and predetermined indexed positions such that the reservoir 206 is in the dispensing position below and aligned with the dispensing unit 210.

Figure 6:
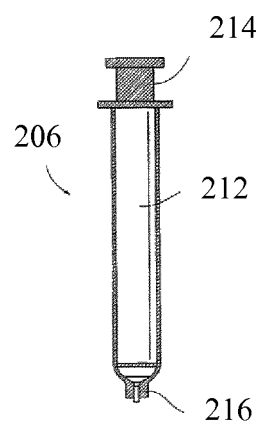
FIG. 6 is a representative section view of a coating reservoir of the second coating apparatus of FIG. 4.

FIG. 6 is a representative section view of an individual coating reservoir 206 of the flexible second coating apparatus 200. Each coating reservoir 206 includes an elongated barrel 212 containing a moveable piston 214 for dispensing of coating material from the coating reservoir 206, and in which advancement of moveable piston 214 of the selected coating reservoir 206 in the dispensing position dispenses coating material from the selected coating reservoir 206. With some embodiments and with further reference to FIG. 6, each coating reservoir 206 is formed as a disposable plastic syringe and thus each coating reservoir 206 dispenses coating through a valve-less dispensing orifice 216 at the distal end of the barrel. Plastic syringes are commercially available and are particularly well suited to form reservoirs 206 due to the precise dispensing characteristics associated there-with. Caps (not shown) on the rear surface and across the orifice 86 can be used for shipping of filled reservoirs 206, with some embodiments. The caps can also be reapplied for removal and storage of reservoirs 206, with some further embodiments.

The narrow orifice 216 of reservoir 206 (with some embodiments in combination with the movable piston 214) allows the coating material to be held in reservoir 206 and dispensed in the absence of a valve. With some embodiments, the valve-less dispenser of reservoir 206 substantially eliminates (except for a single purge drip/drop) priming which is necessary with other spin coater dispensers, and greatly reduces the amount of waste formed during operation of second coating apparatus 200.

Dispensing unit 210 includes a rod 218 aligned with the selected reservoir 206 in the dispensing position and is configured to selectively advance the moveable piston 214 of the selected coating reservoir 206 in the dispensing position to dispense a select (or predetermined) unit amount of coating material from the engaged selected coating reservoir 206. With some embodiments, rod 218 is a screw, such as an elongated screw. With some embodiments, the select (or predetermined) unit amount of coating material dispensed is from 0.2 ml to 4 ml, or from 0.2 to 1 ml, or from 0.2 ml to 0.6 ml. The unit amount includes a coating amount and a purge amount (such as a drop) and can vary depending on parameters, including but not limited to, the coating material, the substrate characteristics, the desired coating thickness, and coating protocol.

With some embodiments, the selected coating reservoir 206 has therein an amount of coating material that is less than that required to coat two optical substrates 100, but more than that required to coat a single optical substrate 100 (i.e., less than two unit amounts). This remainder amount of coating material (i.e., less than two unit amounts) can, with some embodiments, be (i) expelled from coating reservoir 206 for disposal, such as into a disposal receptacle or drain; or (ii) dispensed from coating reservoir 206 onto a single optical substrate 100. After expelling or dispensing the remainder amount of coating material, reservoir 206 is empty and substantially free of coating material, and can be disposed of as solid waste, with some embodiments.

The dispensing unit 210, with some embodiments, includes a motor 220, such as a linear stepper motor or the like, for precisely advancing the moveable piston 214 of a selected coating reservoir to dispense there-from a predetermined amount of coating material. Dispensing unit 210 also senses, with some embodiments, the position of piston 214, via rod 218 or other device, both before and after use, so that the amount of coating material residing in each specific reservoir 206 can be calculated and tracked by second coating apparatus 200. Dispensing unit 210 lifts rod 218 out of barrel 212 to allow for indexing of the carousel of platform 208 to select a distinct reservoir 206, with some embodiments. A reservoir 206 moving out of the dispensing position will not be empty, but will have remaining therein coating material for selective later use, with some embodiments.

In accordance with some embodiments of the present invention, rod 218 is a stationary rod and the motor is moveable, such as vertically moveable, along rod 218. The motor can include an extension (not shown) that engages abuttingly with piston 214. Controllable movement of the motor, such as vertically downward, along the stationary rod serves to drive piston 214 into reservoir 206, which results in dispensing of a select (or predetermined) amount of coating material from orifice 216, with some embodiments.

In operation, the indexable coating reservoir platform 208, the reservoirs 206, and the unit 210 are moveable as a unit, shown schematically at 222, at least between: (i) a purge position, where the selected coating reservoir 206 in the dispensing position is above the coater bowl 202 but is not above the optical substrate 100; and (ii) at least one dispensing position, where the selected coating reservoir in the dispensing position above the coater bowl is above the optical substrate 100. The coater bowl 202 can be constructed to include a trough or extension that extends to a point aligned with the purge position. In the purge position the movable piston 214 is advanced by rod 218 of unit 210 to dispense a minimal purging drop of the coating material to clear the outer surface of the meniscus of coating material at orifice 216 of valve-less reservoir 206. The outer surface of the meniscus can be exposed to air during non-use of the coating material in a given reservoir 206, which can result in oxidation and/or fouling the meniscus, thus requiring purging thereof. A single drop is all that is required to prime the coating material distribution system by purging the possibly non-homogeneous portion of the coating material from orifice 216, with some embodiments. Following the initial purge drop, the indexable coating reservoir platform 208, the reservoirs 206, and the unit 210 are moveable as a single unit, shown schematically at 222, to at least one dispensing position where the selected coating reservoir 206 in the dispensing position above the coater bowl 202 is above the optical substrate 100.

The movement 222 of the selected dispensing reservoir 206 allows the second coating apparatus 200 to accommodate a variety of dispensing protocols for coating the optical substrate 100 on rotatable chuck 204 within coater bowl 202. With some embodiments, the coating material from the selected dispensing reservoir 206 can be dispensed on the optical substrate 100 at the center, and/or at one or more select positions across the surface of the optical substrate 100 (such as in a line, spiral, and/or concentric circles, across/on the upper surface of the optical substrate 100), and then the rotatable chuck 204 is engaged to spin the applied coating material to form a coating layer having substantially uniform thickness. In accordance with some further embodiments, concurrently with spinning of rotatable chuck 204, the coating material from the selected dispensing reservoir 206 is dispensed on the optical substrate 100 at the center, and/or at one or more select positions across the surface of the optical substrate 100 to form a uniform coating. Any desired combination of these dispensing and spinning protocols can be used with the second coating apparatus 200. Additionally the dispensing rate and the spinning speed can also be varied throughout the process, with some embodiments. Intermittent dispensing and/or spinning of the vacuum chuck 204 can used with some embodiments. The dispensing protocols are, with some embodiments, based upon parameters including, but not limited to, the substrate composition and/or surface treatment thereof, the coating material applied, and/or the desired final coating parameters.

The indexable platform 208 allows the second coating apparatus 200 to apply a single or multiple coating layers on the optical substrate 100 without removing the lens from the rotatable chuck 204. With some embodiments and for purposes of non-limiting illustration, in a first stage a first coating layer is applied using one selected reservoir 206, then the carousel is indexed, such that in a second stage a second coating material is applied over the first coating layer from a distinct/separate reservoir 206. The indexing of the carousel can be done with the platform 208 moved away from alignment of the reservoirs 206 with the optical substrate 100, so no stray drips from intermediate reservoirs 206 interfere with the desired coating protocol, and so that in the second stage the second coating material can be properly purged before dispensing over the optical substrate 100. Having two or more coating stages allows the spin coater of the present invention to apply and form numerous combinations of stacked coating layers, in which each coating layer thereof has the same or different composition and/or the same or different thickness relative to an adjacent (or abutting) coating layer.

Curing Station

With reference to FIG. 3, the coating system 10 includes or has integrated therewith at least one distinct curing station 50 for selectively and independently curing (such as at least partially curing) each coating applied to the optical substrate 100. Following the application of the desired coating material to at least one surface of the optical substrate 100, the robotic placement arm 80 reengages the coated optical substrate 100 and moves it to the curing station 50. The robotic placement arm 80 may optionally position the coated optical substrate 100 in the curing station 50 at a predetermined orientation relative to the curing station 50 based on the orientation of the at least one mark 110 on the optical substrate 100.

With some examples shown in FIG. 3, the curing station 50 includes at least one of: (i) a thermal curing station 50a; (ii) a UV curing station 50b; (iii) an IR curing station 50c; and (iv) combinations of at least two of (i), (ii), and (iii). In some examples, the UV curing station 50b of the coating system 10 may have a sliding drawer with a work piece holding a rotatable chuck 52, such as a rotatable vacuum chuck, for selective receipt of a desired optical substrate 100 to be cured. A concave or angled reflective mirror may surround the rotatable chuck 52 to assist or improve in edge curing. With a coated optical substrate 100 on the rotatable chuck 52 of the UV curing station 50b, the drawer is closed and a shutter is opened to expose the coated optical substrate 100 to UV light, such as from a mercury or a metal halide bulb. The rotatable chuck 52 can rotate at various speeds to assure a uniform cure. The curing time within the UV curing station 50b can vary depending on, for example, the particular coating. The IR curing station 50c can have a similar construction as the UV curing station 50b, but includes an appropriate IR source. The curing time within the IR curing station 50c can also vary depending on, for example, the particular coating. Each curing station 50, with some examples, can include therein an atmosphere selected from an inert atmosphere (such as, but not limited to, argon and/or nitrogen) and/or a reactive atmosphere (such as, but not limited to, oxygen, CO, and/or $CO_2$).

The thermal curing station 50a, with some examples, is accompanied with a throughput conveyor 54 and a discharge or accumulation area 56. In the thermal curing station 50a the optical substrates 100 to be thermally cured are placed on the input conveyer 54, such as side-by-side on the conveyor 54. The speed of the conveyor 54 is selected so the coated optical substrates 100 have a desired temperature exposure within the thermal curing station 50a. The oven of the thermal curing station 50a can, with some examples, be an electric oven and/or a gas fired oven (such as a natural gas fired oven). The curing times and temperature profiles can vary depending on, for example, the coating that is to be cured. With some examples, the coated optical substrates 100 are exposed to a temperature of 115°–135° C. for 20-40 minutes, such as 30 minutes at 125° C. within the thermal curing station 50a. Following at least partial curing, the coated optical substrates 100 are forwarded to the accumulation area 56 designed to accommodate a desired number of optical substrates 100 with no edges touching there-between (such as, but not limited to, up to 30 coated optical substrates 100).

With some examples, the conveyor 54 in concert with the robotic placement arm 80 is used for egress of at least partially cured coated optical substrates 100 from the IR curing station 50c and/or the UV curing station 50b. With some examples, a separate exit conveyor 54 (not shown) is used to bypass the thermal curing station 50a for purposes of delivering coated optical substrates 100 to the accumulation area 56.

With some additional examples, a coated and cured optical substrate 100 can be returned from the curing station 50 to: (i) the washing and drying station 70; and/or (ii) the coating apparatus 30 for the application thereto of a subsequent coating material. The cured optical substrate 100 can, with some examples, be moved from the accumulation area 56 to a final inspection area or a packing area (not shown).

The present invention has been described with reference to specific details of particular examples thereof. It is not intended that such details be regarded as limitations upon the scope of the invention except insofar as and to the extent that they are included in the accompanying claims.

What is claimed is:

1. A coating system for coating an optical substrate, the coating system comprising:
    an identification apparatus configured for identifying an orientation of at least one mark on a top surface or a bottom surface of an optical substrate;
    a first coating apparatus configured to apply at least one coating material on at least a portion of the top surface of the optical substrate in a predetermined pattern by a controlled deposition of the at least one coating material in an atomized droplet form;
    a second coating apparatus, wherein the second coating apparatus is a spin coating apparatus; and
    a placement arm configured to move the optical substrate from the identification apparatus to the first coating apparatus and position the optical substrate at a predetermined orientation relative to the first coating apparatus based on the orientation of the at least one mark, wherein the placement arm is further configured to move the optical substrate from the identification apparatus to a rotatable chuck of the second coating apparatus.

2. The coating system of claim 1, wherein the identification apparatus comprises at least one sensor for determining the orientation of the at least one mark.

3. The coating system of claim 2, wherein the at least one sensor is an optical sensor.

4. The coating system of claim 1, wherein the identification apparatus comprises a backlit table.

5. The coating system of claim 1, wherein the placement arm moves the optical substrate to the predetermined orientation.

6. The coating system of claim 1, wherein at least a portion of the identification apparatus moves to assist in positioning the optical substrate to the predetermined orientation.

7. The coating system of claim 1, wherein the first coating apparatus is a piezo-electric inkjet coating apparatus or a thermal inkjet printing apparatus.

8. The coating system of claim 1, wherein the first coating apparatus comprises one or more cartridges filled with the at least one coating material.

9. The coating system of claim 1, further comprising at least one curing station, where each curing station is independently configured to at least partially cure at least one coating material applied to the optical substrate.

10. The coating system of claim 9, wherein each curing station independently comprises at least one of (i) a thermal curing station; (ii) a UV curing station; (iii) an IR curing station; and (iv) combinations of at least two of (i), (ii), and (iii).

11. The coating system of claim 1, further comprising a washing and drying station, wherein the washing and drying station is configured to selectively wash and dry each optical substrate, and wherein the washing and drying station is accessible by the placement arm.

12. The coating system of claim 1, further comprising a pre-treatment station, wherein the pre-treatment station is configured for raising wettability of the optical substrate to promote adhesion of the at least one coating material with the optical substrate, and wherein the pre-treatment station is accessible by the placement arm.

* * * * *